United States Patent
Dragoset, Jr.

(10) Patent No.: US 8,077,544 B2
(45) Date of Patent: Dec. 13, 2011

(54) DUAL-WAVEFIELD MULTIPLE ATTENUATION

(75) Inventor: William Henry Dragoset, Jr., Houston, TX (US)

(73) Assignee: Westerngeco L.L.C., Houston, TX (US)

(*) Notice: Subject to any disclaimer, the term of this patent is extended or adjusted under 35 U.S.C. 154(b) by 750 days.

(21) Appl. No.: 12/058,312

(22) Filed: Mar. 28, 2008

(65) Prior Publication Data

US 2009/0245022 A1 Oct. 1, 2009

(51) Int. Cl.
*G01V 1/38* (2006.01)
(52) U.S. Cl. ............................. 367/24; 367/21
(58) Field of Classification Search .................. 367/21, 367/24, 38, 45, 53
See application file for complete search history.

(56) References Cited

U.S. PATENT DOCUMENTS

| | | | |
|---|---|---|---|
| 4,486,865 A | 12/1984 | Ruehle | |
| 5,995,905 A * | 11/1999 | Ikelle et al. | 702/16 |
| 6,101,448 A * | 8/2000 | Ikelle et al. | 702/17 |
| 6,507,787 B1 * | 1/2003 | Da Silva et al. | 702/1 |
| 6,775,618 B1 | 8/2004 | Robertsson et al. | |
| 7,123,543 B2 * | 10/2006 | Vaage et al. | 367/24 |
| 7,359,283 B2 * | 4/2008 | Vaage et al. | 367/24 |
| 7,505,361 B2 * | 3/2009 | Sollner | 367/24 |
| 2004/0008577 A1 * | 1/2004 | Moldveanu | 367/4 |
| 2004/0145968 A1 * | 7/2004 | Brittan et al. | 367/15 |
| 2006/0227660 A1 * | 10/2006 | Grion | 367/24 |
| 2006/0250890 A1 * | 11/2006 | van den Berg et al. | 367/24 |
| 2007/0189117 A1 * | 8/2007 | Robertsson et al. | 367/24 |
| 2008/0019215 A1 * | 1/2008 | Robertsson et al. | 367/19 |

OTHER PUBLICATIONS

Dragoset, et al., Some Remarks on Surface Multiple Attenuation, Geophysics, Mar.-Apr. 1998, pp. 772-789, vol. 63 No. 2.
Ikelle et al., Kirchhoff Scattering Series: Another Insight into the Multiple Attenuation Method, Geophysics, Jan.-Feb. 2003, pp. 16-28, vol. 68 No. 1.
Dragoset, et al., The Impact of Field Survey Characteristics on Surface-Related Multiple Attenuation, Offshore Technology Conference Proceedings, 2004, Paper 16492 (also, Geophysical Prospecting, 2006, pp. 781-792, vol. 54).
Schalkwijk, et al., Case Study Example of Multiple Attenuation for Over/Under Streamer Data, EAGE Annual Meeting, 2006.
Sollner, et al., Surface-Related Multiple Suppression in Dual-Sensor Towed-Streamer Data, SEG Expanded Abstracts, 2007, pp. 2450-2544, vol. 26.
Mark Egan, Khadir George El-Kasseh & Nick Moldoveanu, "Full Deghosting of OBC Data with Over/Under Source Acquisition" SEG/San Antonio 2007 Annual Meeting, pp. 31-35.
B. J. Posthumus, "Deghosting Using a Twin Streamer Configuration" Geophysical Prospecting, 1993, pp. 267-286, vol. 41.

* cited by examiner

*Primary Examiner* — Jack Keith
*Assistant Examiner* — Daniel L Murphy

(57) ABSTRACT

Method for attenuating surface multiple reflections in dual-wavefield seismic data. In one implementation, the method may include: (a) performing wavefield separation on dual-wavefield seismic data to separate events in the seismic data into data sets according to ghost characteristics; (b) applying a multidimensional Surface-Related Multiple Elimination (SRME) to two or more of the data sets to yield an SRME result in a manner that retains surface reflection information affecting surface multiple reflections; and (c) repeating step (b) one or more times.

18 Claims, 8 Drawing Sheets

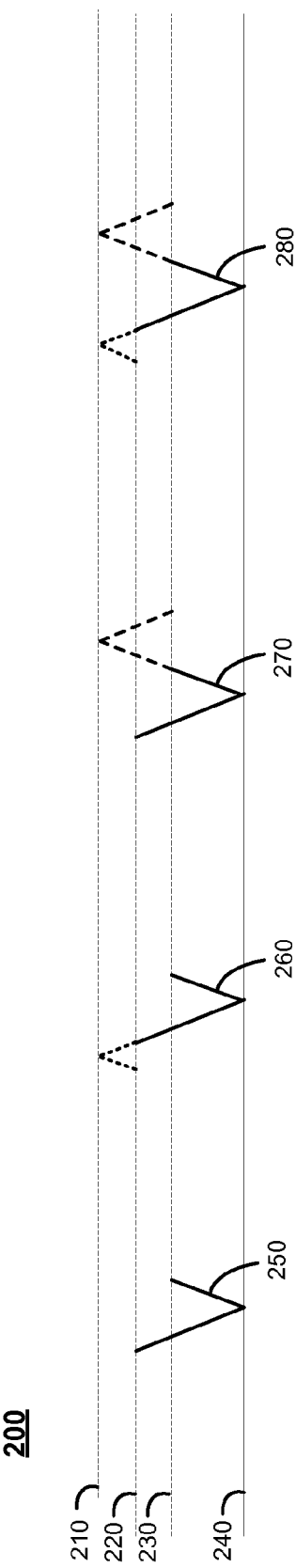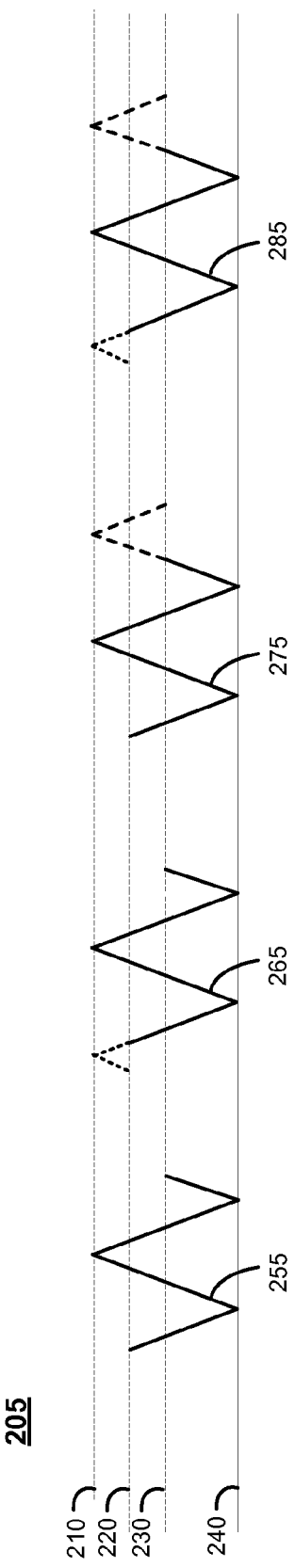

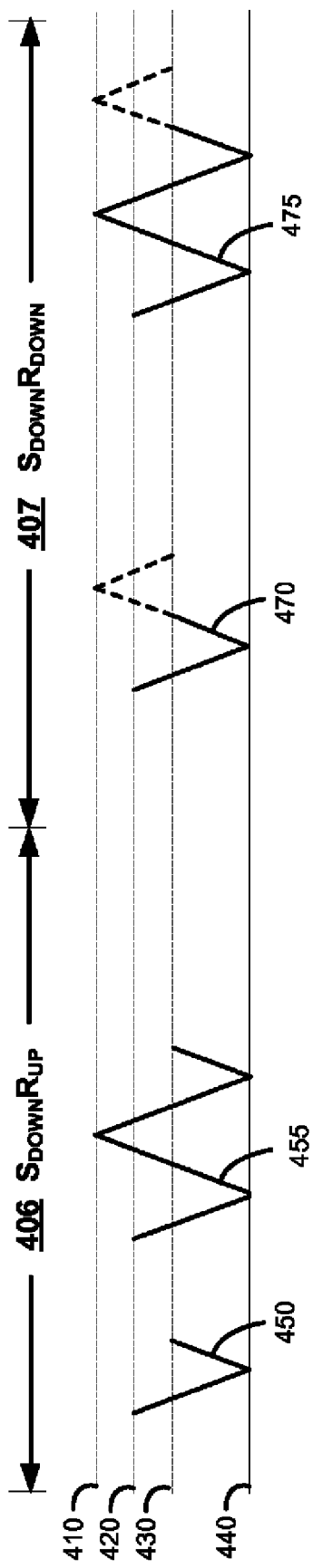
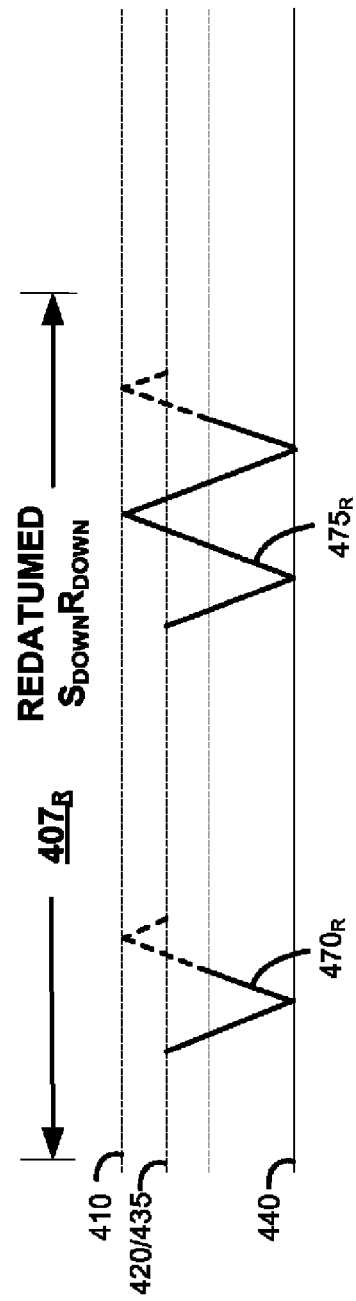
FIG. 4C
FIG. 4D

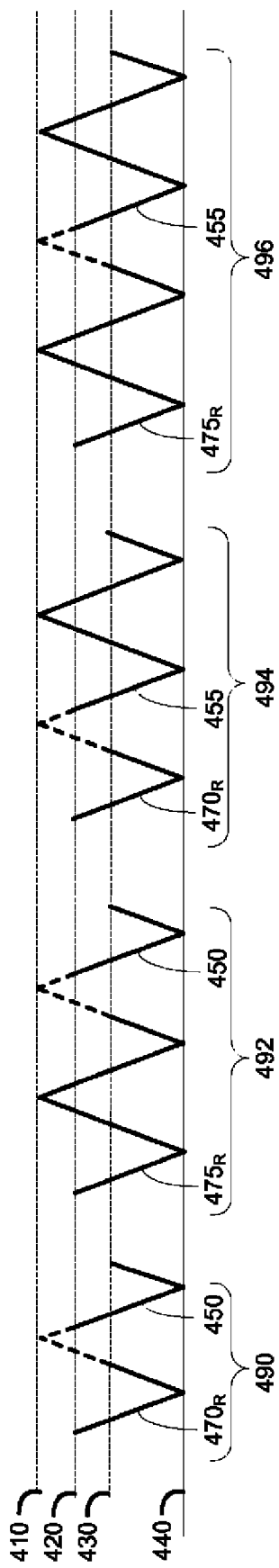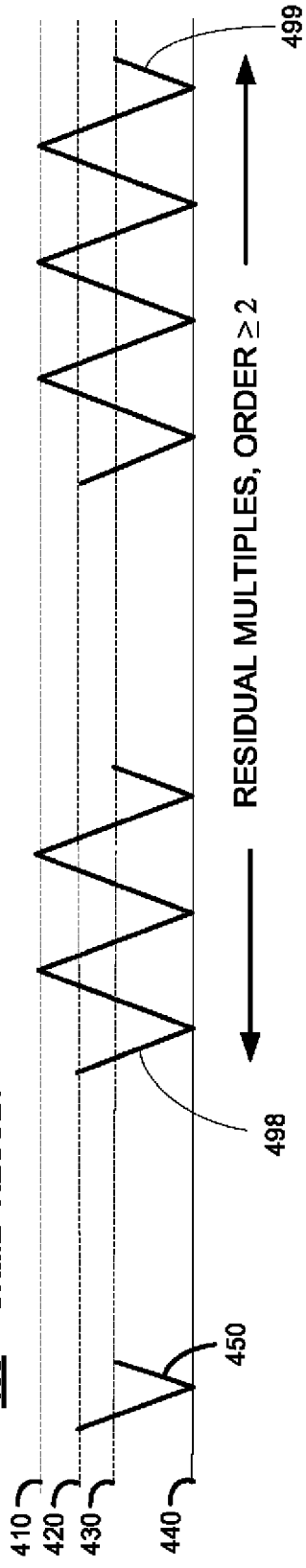

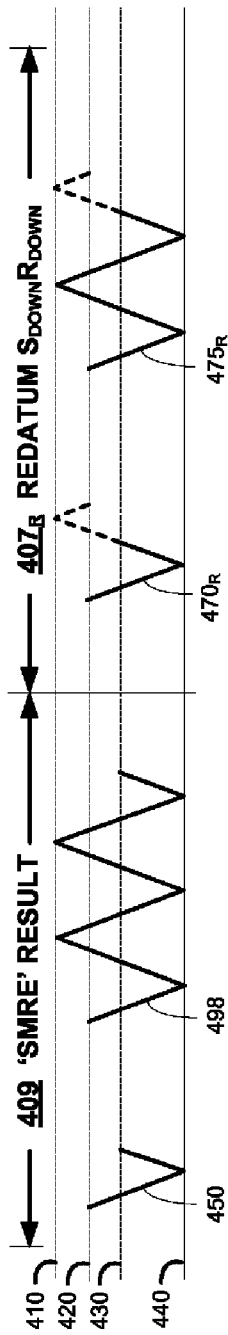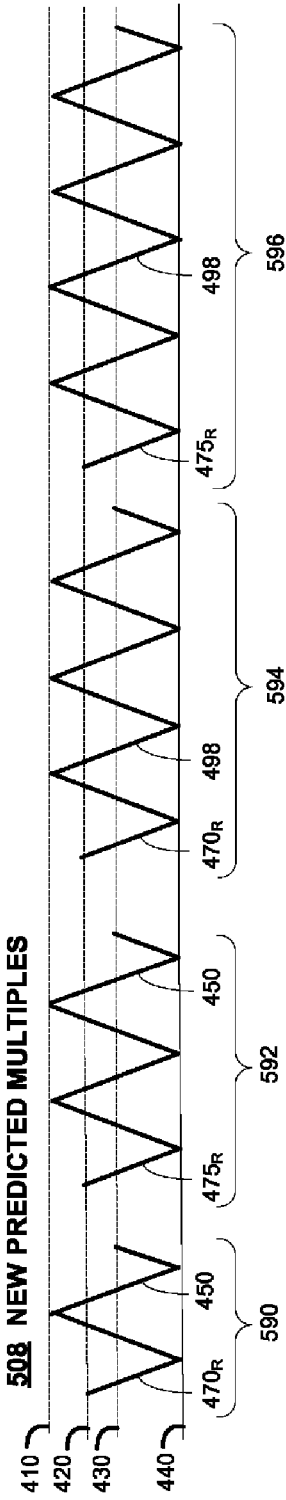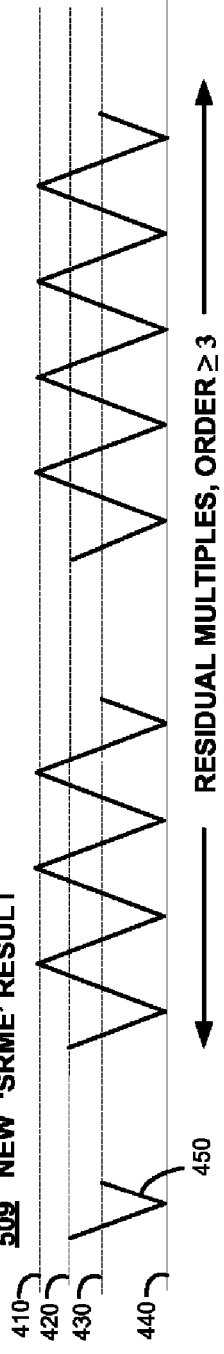
FIG. 5A
FIG. 5B
FIG. 5C

DUAL-WAVEFIELD MULTIPLE ATTENUATION

BACKGROUND

1. Field of the Invention

Embodiments of the present invention generally relate to marine seismic surveying and, more particularly, to a method for attenuating multiples in seismic data.

2. Description of the Related Art

The following descriptions and examples do not constitute an admission as prior art by virtue of their inclusion within this section.

Seismic surveying is a method for determining the structure of subterranean formations in the earth. Seismic surveying may typically utilize seismic energy sources which generate seismic waves and seismic receivers which detect seismic waves. The seismic waves may propagate into the formations in the earth, where a portion of the waves may reflect from interfaces between subterranean formations. The seismic receivers may detect the reflected seismic waves and convert the reflected waves into representative electrical data. The seismic data may be transmitted by electrical, optical, radio or other means to devices which record the data. Through analysis of the recorded seismic data (or seismograms), the shape, position and composition of the subterranean formations may be determined.

Marine seismic surveying is a method for determining the structure of subterranean formations underlying bodies of water. Marine seismic surveying may typically utilize seismic energy sources and seismic receivers located in the water which may be either towed behind a vessel or positioned on the water bottom from a vessel. The energy source may typically be an explosive device or compressed air system which generates seismic energy, which then propagates as seismic waves through the body of water and into the earth formations below the bottom of the water. As the seismic waves strike interfaces between subterranean formations, a portion of the seismic waves may reflect back through the earth and water to the seismic receivers, to be detected, transmitted, and recorded. The seismic receivers typically used in marine seismic surveying may be pressure sensors, such as hydrophones. Additionally, motion sensors, such as accelerometers, may be used. Both the sources and receivers may be strategically repositioned to cover the survey area.

In some seismic surveys, dual-wavefield seismic data may be recorded. Dual-wavefield seismic data refers to seismic data acquired using two sets of sources and/or two sets of receivers. The sets of sources and/or sets of receivers may be different types of sources and/or receivers or they may be positioned at different depths.

SUMMARY

Described herein are implementations of various techniques for a method for attenuating surface multiple reflections in dual-wavefield seismic data. In one implementation, the method may include: (a) performing wavefield separation on dual-wavefield seismic data to separate events in the seismic data into data sets according to ghost characteristics; (b) applying a multidimensional Surface-Related Multiple Elimination (SRME) to two or more of the data sets to yield an SRME result in a manner that retains surface reflection information affecting surface multiple reflections; and (c) repeating step (b) one or more times.

In another implementation, the method may include: (a) performing wavefield separation on dual-wavefield seismic data to separate events in the seismic data into data sets according to ghost characteristics; (b) performing multi-dimensional convolutions using two or more of the data sets to predict multiples; (c) adaptively subtracting the predicted multiples from one of the data sets to yield an SRME result; and (d) repeating steps (b)-(c) one or more times.

In yet another implementation, the method may include (a) performing source-side wavefield separation on the dual-wavefield seismic data to divide the seismic data into a source-side upgoing data set and a source-side downgoing data set; (b) discarding the source-side upgoing data set; (c) performing receiver-side wavefield separation on the source-side downgoing data set to subdivide the source-side downgoing data set into a source-side downgoing and receiver-side upcoming data set and a source-side downgoing and receiver-side downcoming data set; (d) performing multi-dimensional convolutions using the source-side downgoing and receiver-side upcoming data set and the source-side downgoing and receiver-side downcoming data set to predict multiples; (e) adaptively subtracting the predicted multiples from the source-side downgoing and receiver-side upcoming data set to yield an SRME result; and (f) repeating steps (d)-(e) one or more times using the SRME result from the previous step (e) in place of the source-side downgoing and receiver-side upcoming data set when performing the multi-dimensional convolutions of step (d).

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIGS. 2A and 2B illustrate the raypaths of the four events for a primary reflection and the four events for a first-order multiple reflection in accordance with implementations of various techniques described herein.

FIGS. 4A-4F illustrate the application of wavefield separation and SRME to dual-wavefield seismic data in accordance with implementations of various techniques described herein.

FIGS. 5A-5C illustrate a second iteration of SRME in accordance with implementations of various techniques described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to a method for attenuating surface multiple reflections in dual-wavefield seismic data.

Figure 1:
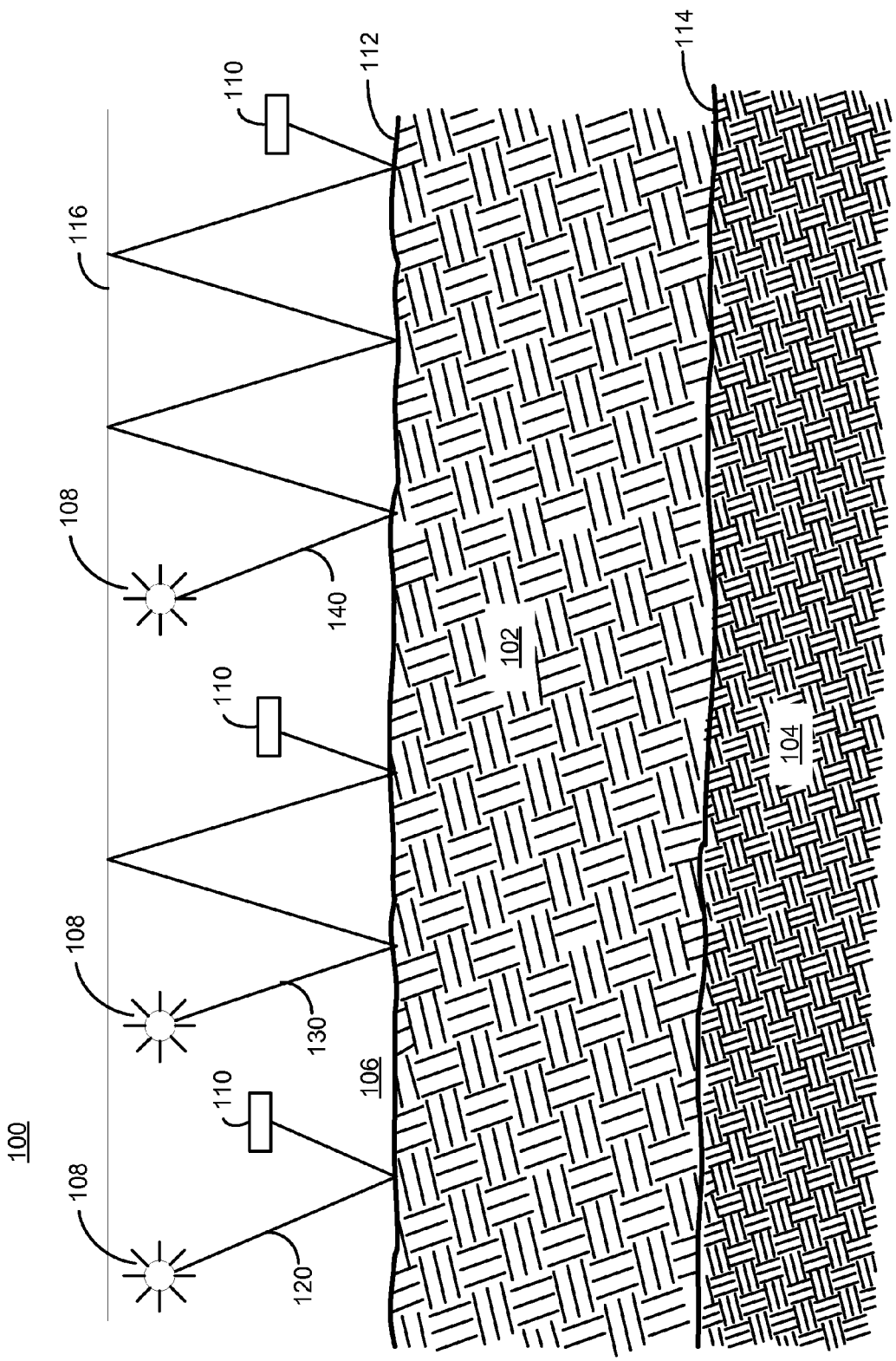
FIG. 1 illustrates a diagrammatic view of marine seismic surveying in connection with implementations of various techniques described herein.

FIG. 1 illustrates a diagrammatic view of marine seismic surveying in connection with implementations of various techniques described herein. The procedure is designated generally as 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between two subterranean formations, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interfaces below, and the downward reflector at the water surface 116 above. Each time the reflected waves propagate past the position of a seismic receiver 110, the receiver 110 senses the reflected waves and generates representative signals.

A reflected wavefield may consist of both primary reflections and multiple reflections. Primary reflections may be defined as seismic waves which have reflected only once, from the water bottom 112 or an interface between subterranean formations, before being detected by a seismic receiver 110. An example of a primary reflection is shown in FIG. 1 by raypath 120. Primary reflections contain the desired information about the subterranean formations which is the goal of marine seismic surveying.

Seismic waves, however, may also reflect downward from the water surface and may continue to reflect. Multiple reflections, or multiples, may be defined as seismic waves which have reflected more than once before being detected by a seismic receiver 110. Surface multiples are those waves which have reflected multiple times between the water surface 116 and any upward reflectors, such as the water bottom 112 or formation interfaces, before being sensed by a receiver 110. An example of a surface multiple is shown by raypath 130. The surface multiple shown by raypath 130 is a multiple of order one, since the multiple contains one added reflection from the water surface 116. An example of a multiple of order two is shown by raypath 140. The multiple contains two added reflections from the water surface 116. In general, a surface multiple is of order i if the multiple contains i additional reflections from the water surface 116.

A goal of seismic data processing may be to enhance primary reflections, which may then be interpreted as subsurface interfaces. Multiple reflections may be noise which obscures the desired primary reflection signal. Seismic data processing may be used to attenuate multiple reflections in seismic data.

Before describing methods to attenuate multiple reflections in seismic data, an understanding of primary and multiple reflections may be necessary. In standard, unprocessed marine seismic streamer data, each reflection, whether a primary reflection or a multiple reflection, may consist of four events, a ghost-free event, a source ghost event, a receiver ghost event and a combined source and receiver ghost event. In FIG. 1, the raypath 120 illustrates a ghost-free event for a primary reflection, the raypath 130 illustrates a ghost-free event for a first-order multiple reflection, and the raypath 140 illustrates a ghost-free event for a second-order multiple reflection. FIGS. 2A and 2B illustrate the raypaths of the four events for a primary reflection 200 and the four events for a first-order multiple reflection 205 in accordance with implementations of various techniques described herein.

FIG. 2A illustrates the raypaths of the four events for a primary reflection 200. Note that for simplicity in illustration, a source 220 depth line is depicted rather than individual sources. Likewise receivers are also depicted by a receiver 230 depth line. The raypath of the ghost-free event 250 (depicted with a solid line) of the primary reflection 200 describes energy that travels directly from the source 220 to the subsurface 240 and then directly back to a receiver 230. The ghost-free event 250 has a downward path from the source 220 and an upward path to the receiver 230 and may also be referred to as an SdownRup event. The raypath of the source ghost event 260 of the primary reflection 200 describes energy that travels from the source 220 to the sea surface 210, then to the subsurface 240 and then back to a receiver 230. Note that the raypath of the source ghost event 260 is actually the ghost-free event 250 (depicted with a solid line) with an added source ghost reflection (depicted with a dotted line) from the sea surface. The source ghost event 260 has an upward path from the source 220 and an upward path to the receiver 230 and may also be referred to as an SupRup event. The raypath of the receiver ghost event 270 of the primary reflection 200 describes energy that travels from the source 220 to the subsurface 240, then back to the sea surface 210, and finally to a receiver 230. Note that the raypath of the receiver ghost event 270 is actually the ghost-free event 250 (depicted with a solid line) with an added receiver ghost reflection (depicted with a dashed line) from the sea surface. The receiver ghost event 270 has a downward path from the source 220 and a downward path to the receiver 230 and may also be referred to as an SdownRdown event. The raypath of the combined source and receiver ghost event 280 of the primary reflection 200 describes energy that travels from the source 220 to the sea surface 210, then to the subsurface 240, then back to the sea surface 210, and finally to a receiver 230. Note that the raypath of the combined source and receiver ghost event 280 is actually the ghost-free event 250 (depicted with a solid line) with an added source ghost reflection (depicted with a dotted line) from the sea surface and an added receiver ghost reflection (depicted with a dashed line) from the sea surface. The combined source and receiver ghost event 280 has an upward path from the source 220 and a downward path to the receiver 230 and may also be referred to as a SupRdown event.

FIG. 2B illustrates the raypaths of the four events for a first-order multiple reflection 205. The raypaths of the four events for a first-order multiple reflection 205 may be the same raypaths as the primary reflection with an added reflection from the sea surface 210 and subsurface 240. For example, the raypath of the ghost-free multiple event 255 of the first-order multiple reflection 205 describes the same path as the raypath of the ghost-free event 250 of the primary reflection with an additional reflection from the sea surface 210 and subsurface 240. Like the ghost-free event 250, the ghost-free multiple event 255 has a downward path from the source 220 and an upward path to the receiver 230 and may also be referred to as an SdownRup event. Ghost-free events may be synonymous with SdownRup events. The raypath of the source ghost multiple event 265 of the first-order multiple reflection 205 describes the same path as the raypath of the source ghost event 260 of the primary reflection 200 with an additional reflection from the sea surface 210 and subsurface 240. The raypath of the source ghost event 265 may be described as the ghost-free multiple event 255 (depicted with a solid line) with an added source ghost reflection (depicted with a dotted line) from the sea surface. Like the source ghost event 260, the source ghost multiple event 265 has an upward path from the source 220 and an upward path to the receiver 230 and may also be referred to as a SupRup event. Source ghost events may be synonymous with SupRup events. The raypath of the receiver ghost multiple event 275 of the first-order multiple reflection 205 describes the same path as the raypath of the receiver ghost event 270 of the primary reflection 200 with an additional reflection from the sea surface 210 and subsurface 240. The raypath of the receiver ghost event 275 may be described as the ghost-free multiple event 255 (depicted with a solid line) with an added receiver ghost reflection (depicted with a dashed line) from the sea surface. Like the receiver ghost event 270, the receiver ghost multiple event 275 has a downward path from the source 220 and a downward path to the receiver 230 and may also be referred to as an SdownRdown event. Receiver ghost events may be synonymous with SdownRdown events. The raypath of the combined source and receiver ghost multiple event 285 of the first-order multiple reflection 205 describes the same path as the raypath of the combined source and receiver ghost event 280 of the primary reflection 200 with an additional reflection from the sea surface 210 and subsurface 240. The raypath of the combined source and receiver ghost event 285 may be described as the ghost-free multiple event 255 (depicted with a solid line) with an added source ghost reflection (depicted with a dotted line) from the sea surface and an added receiver ghost reflection (depicted with a dashed line) from the sea surface. Like the combined source and receiver ghost event 280, the combined source and receiver ghost multiple event 285 has an upward path from the source 220 and a downward path to the receiver 230 and may also be referred to as a SupRdown event. Combined source and receiver ghost events may be synonymous with SupRdown events.

Although seismic events are described herein as raypaths, it should be understood that seismic events are wavefield phenomena. Those having common knowledge in the art will recognize the equivalence and relationship of the raypath description to the underlying wavefield physics.

Various methods have been developed to attenuate multiple reflections in seismic data. For example, Surface Related Multiple Elimination (SRME) is a process that predicts surface multiples by stacking convolved pairs of recorded seismograms and adaptively subtracting the predicted multiples from the recorded seismograms to remove surface multiples. However, application of SRME may require awareness of several possible problems. Two potential problems in using SRME may be properly handling ghosts and properly predicting sea surface reflection effects.

When processed by SRME, ghosts in seismic data may create extra predicted multiples. For example, SRME prediction of the first-order multiple reflection 205 in FIG. 2B may involve convolving the primary reflection 200 of FIG. 2A with itself. Since the primary reflection 200 consists of four events, the result of such a convolution would be sixteen predicted multiple events. The recorded first-order multiple reflection 205 shown in FIG. 2B has only four events. Ideally, the predicted multiples may be subtracted from the recorded data to obtain a multiple-free data set. Because there are sixteen predicted multiple events and only four recorded multiple events, SRME will not work without some method of eliminating the extra predicted multiple events.

One method for eliminating the extra predicted multiples may be least-squares adaptive subtraction. Least-squares adaptive subtraction works by designing a filter that converts the predicted multiples into an estimate of the actual multiples. However, experience with field data has shown that adaptive subtraction may work best when the filters designed are relatively simple, which may not be the case when the filters must compensate for ghost-induced effects. Because ghost-induced effects may depend on the 3D orientation of the wavefields in seismic data relative to the sea surface, typically no single matching filter may compensate for all of the ghost-induced effects.

A second method for eliminating the extra predicted multiples may be to deghost the recorded seismic data prior to multiple prediction. Ideally, after deghosting, the ghost-free event may be the only event for each reflection, either primary or multiple; thus the SRME convolution may not produce extra events. For example, in FIG. 2A the ghost-free event 250 may be the only raypath remaining in the primary reflection 200. However, in practice, thorough deghosting may be difficult for several reasons. For example, ghost-induced effects may depend on the 3D orientation of the wavefields in seismic data relative to the sea surface. Also, at some frequencies ghost-induced effects may cause destructive interference, which may lead to stability problems in designing and applying a deghosting filter for standard seismic data. Finally, deghosting may be difficult because the sea surface may not be an ideal specular reflector. A specular reflector may be defined as a reflector that causes the mirror-like reflection of a wave from a surface, in which a ray from a single incoming direction is reflected in a single outgoing direction.

A third method for eliminating the extra predicted multiples may be to include a deghosting operation within the SRME prediction algorithm. This approach may suffer from the same limitations as does stand-alone deghosting prior to SRME. Nevertheless, deghosting, either internal or external to SRME, combined with adaptive subtraction may remove a significant amount of multiples. Often, however, residual multiples remain in the data after SRME processing. Imperfect deghosting may be one possible cause of residual multiples.

The other potential problem in using SRME may be properly predicting sea surface effects. A surface multiple reflection may be affected by the sea surface at N locations along its raypath, where N is the order of the multiple or number of added reflections from the sea surface. If the sea surface is not specular, then multiples predicted by standard SRME may not contain the effect the sea surface reflections had on the recorded multiples. The sea surface may not be a specular reflector, but rather may cause a complicated scattering reflection. Sea surface reflection effects may typically be ignored by SRME causing incorrect prediction of multiples. Incorrect prediction of multiples may produce residual multiples in the SRME result.

One method that may be used to assist in deghosting seismic data may be to acquire dual-wavefield data. Dual-wavefield data measures the wavefield twice either by measuring the same characteristic at different depths or by measuring different characteristics. For example, dual-sensor data, such as pressure data and vertical particle velocity data, may be recorded. In another example, pressure data at two different depths may be recorded by using over/under streamers. Dual-wavefield data measurements may allow recorded wavefields to be separated into their downward- and upward-traveling components. The wavefield may be separated on the source-side based on whether the raypath leaves the source going upward toward the sea surface 210 or going downward toward the subsurface 240. The wavefield may be separated on the receiver-side based on whether the raypath arrives at the receiver coming upward from the subsurface 240 or coming downward from the sea surface 210. For example, referring to FIG. 2A, wavefield separation on the source-side separates the downgoing raypaths, ghost-free event 250 and receiver ghost event 270 (depicted with a solid line from the source 220) from the upgoing raypaths, source ghost event 260 and combined source and receiver ghost event 280 (depicted with a dotted line from the source 220). Similarly, wavefield separation on the receiver-side separates the upcoming raypaths, ghost-free event 250 and source ghost event 260 (depicted with a solid line to the receiver 230) from the downcoming raypaths, receiver ghost event 270 and combined source and receiver ghost event 280 (depicted with a dashed line to the receiver 230). In this context, wavefield separation may perform deghosting; that is, wavefield separation may be used to isolate ghost-free events which contain no ghosts by performing both source-side and receiver-side wavefield separation. For example, source-side wavefield separation may be performed to obtain the downgoing raypaths, ghost-free event 250 and receiver ghost event 270 (depicted with a solid line from the source 220). Then receiver-side separation may be performed on the source-side downgoing raypaths to separate the receiver-side upcoming raypath, ghost-free event 250 (depicted with a solid line to the receiver 230). Although dual-wavefield measurements may allow better methods of deghosting than those based purely on data processing of single-wavefield measurements, the sea surface effects on the predicted multiples may remain a difficulty.

The following paragraphs generally describe one or more implementations of various techniques directed to a method for attenuating surface multiple reflections in dual-wavefield seismic data. In one implementation, source-side wavefield separation may be performed on dual-wavefield seismic data to isolate source-side downgoing wavefields, Sdown. Then, receiver-side wavefield separation may be performed on the isolated source-side downgoing wavefields to subdivide the source-side downgoing wavefields into a receiver-side upcoming wavefield, SdownRup, and a receiver-side downcoming wavefield, SdownRdown. Two dimensional (2D) or three dimensional (3D) SRME may then be performed on the subdivided source-side downgoing wavefields, SdownRup and SdownRdown to yield a set of predicted multiples. The set of predicted multiples may then be adaptively subtracted from the SdownRup wavefield to yield an SRME result. Both the SRME calculation and the adaptive subtraction may be repeated one or more times. In the iterative SRME steps, the latest SRME result may be used in place of the original SdownRup data. However, in the iterative adaptive subtraction steps, the predicted multiples may be subtracted from the original SdownRup data set. Using this method, surface multiple reflections in dual-wavefield seismic data may be attenuated in a manner that avoids problems associated with ghost reflections and other sea surface reflection effects.

Figure 3:
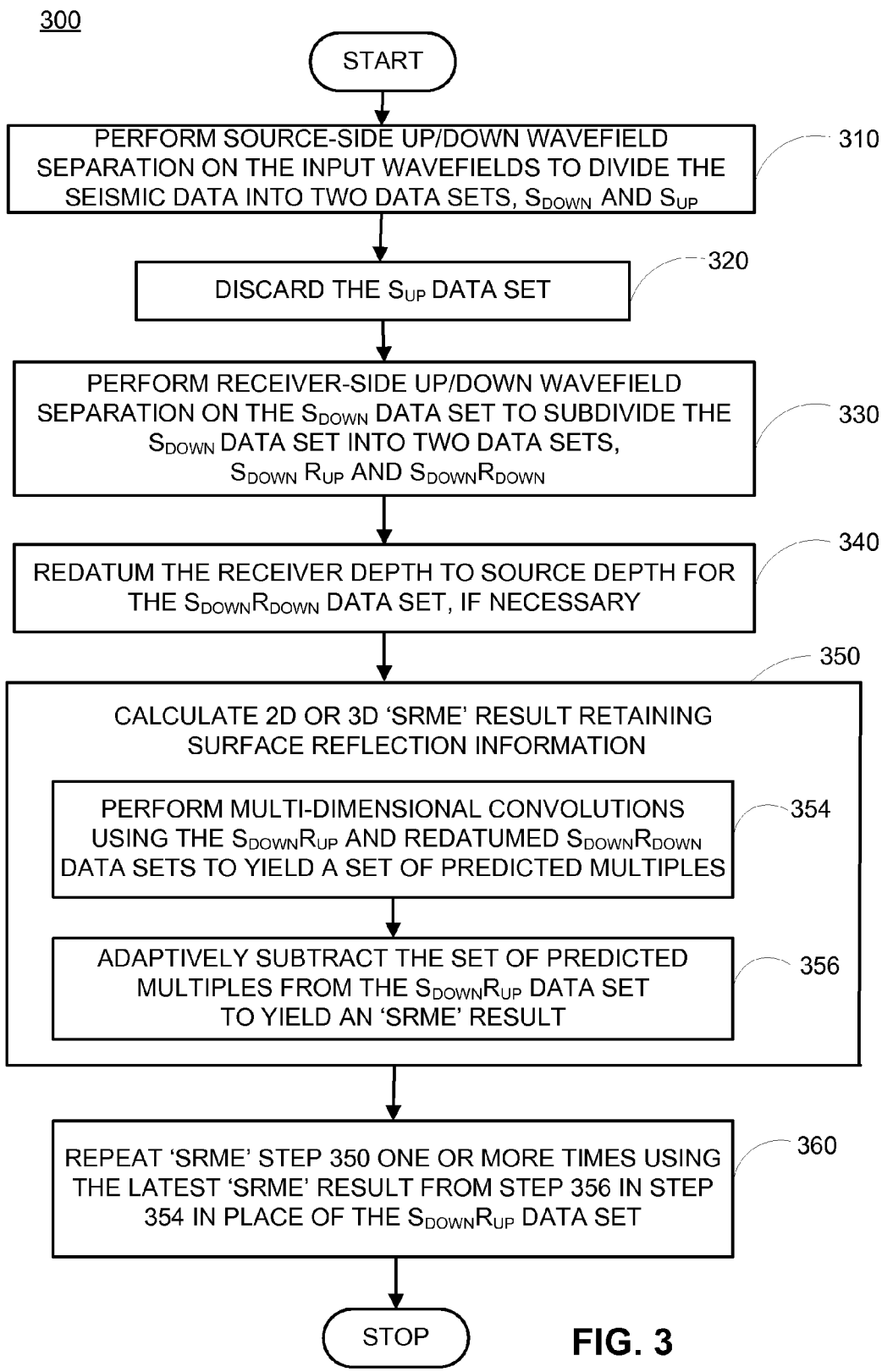
FIG. 3 illustrates a flow diagram of a method for attenuating surface multiple reflections in dual-wavefield seismic data in accordance with implementations of various techniques described herein.

FIG. 3 illustrates a flow diagram of a method 300 for attenuating surface multiple reflections in dual-wavefield seismic data in accordance with implementations of various techniques described herein. However, it should be understood that the operations illustrated in flow diagram are not necessarily limited to being performed by method 300. Additionally, it should be understood that while the operational flow diagram 300 indicates a particular order of execution of the operations, in other implementations, the operations might be executed in a different order.

Figure 4A:
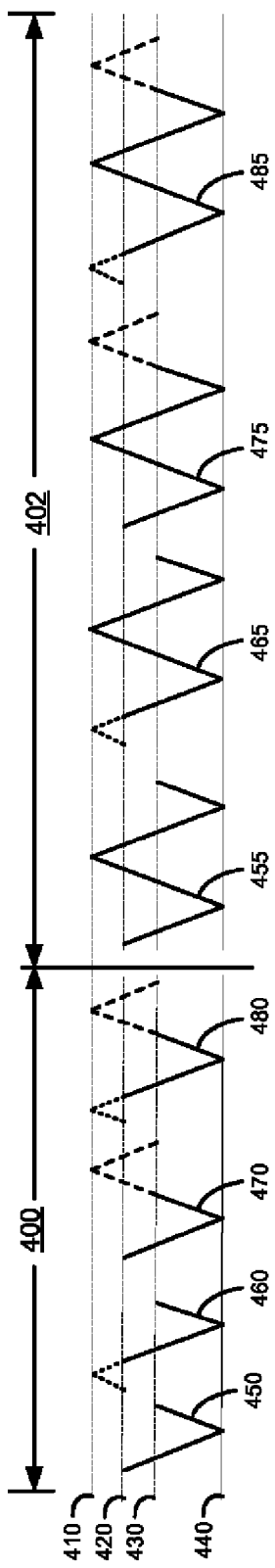
Figure 4B:
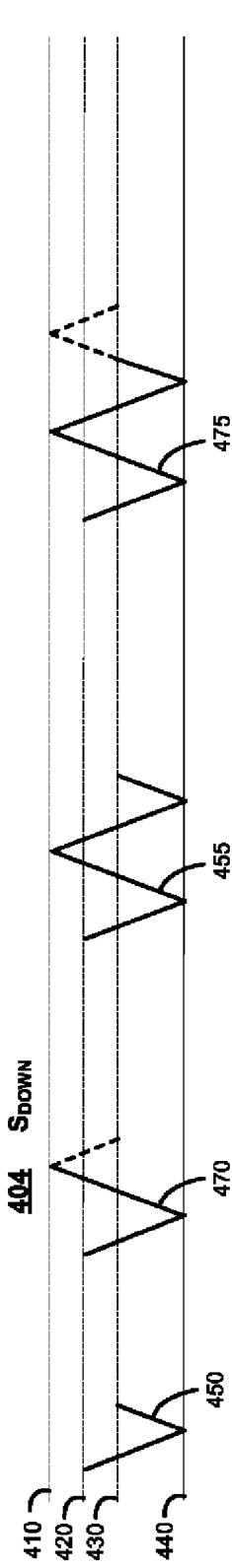

At step 310, source-side upgoing and downgoing wavefield separation may be performed on the dual-wavefield seismic data to divide the seismic data into two data sets, Sdown and Sup. It should be noted that the dual-wavefield seismic data may be dual-receiver data and/or dual-source data that may be either 2D or 3D. Further, the standard data preparation for SRME may be already applied to the dual-wavefield seismic data. Because the dual-wavefield seismic data may include both the primary reflection and any number of multiple reflections, the separated data sets, Sdown and Sup, may also include events from the primary reflection and multiple reflections. For example, FIG. 4A illustrates dual-wavefield seismic data with a primary reflection 400 and a first order multiple reflection 402. The primary reflection 400 may include a ghost-free raypath 450, a source ghost raypath 460, a receiver ghost raypath 470 and a combined source and receiver ghost raypath 480. The first order multiple reflection 402 may include a ghost-free raypath 455, a source ghost raypath 465, a receiver ghost raypath 475 and a combined source and receiver ghost raypath 485. It should be understood that typical dual-wavefield data may include any number of multiple reflections and that only the primary reflection 400 and first order multiple reflection 402 are illustrated for simplicity. Source-side wavefield separation may be performed on the dual-wavefield seismic data of FIG. 4A yielding an Sdown data set and a Sup data set. FIG. 4B illustrates the Sdown data set 404 and the Sup data set 405 resulting from source-side wavefield separation of the dual-wavefield seismic data of FIG. 4A. Note that both the primary reflection 400 source-side downgoing raypaths 450 and 470 and the first order multiple reflection 402 source-side downgoing raypaths 455 and 475 are part of the Sdown data set 404. Likewise, both the primary reflection 400 source-side upgoing raypaths 460 and 480 and the first order multiple reflection 402 source-side upgoing raypaths 465 and 485 are part of the Sup data set 405.

At step 320, the Sup data set 405 may be discarded. Removing the Sup data set 405 may be referred to as source deghosting because the raypaths with source ghosts (depicted with dotted lines to the sea surface) may be removed.

At step 330, receiver-side wavefield separation may be performed on the Sdown data set 404 from step 310 to subdivide the Sdown data set 404 into two sets of data, SdownRup and SdownRdown. For example, the Sdown data set 404 in FIG. 4B may be further divided in the two data sets in FIG. 4C, the SdownRup data set 406 and the SdownRdown data set 407. Note that the SdownRup data set 406 contains only ghost-free raypaths, the ghost-free raypath 450 of the primary reflection 400, the ghost-free raypath 455 of the first order multiple reflection 402 and the ghost-free raypaths of any higher order multiple reflections. The SdownRdown data set 407 only contains receiver ghost raypaths, the receiver ghost raypath 470 of the primary reflection 400, the receiver ghost raypath 475 of the first order multiple reflection 402 and the receiver ghost raypaths of any higher order multiple reflections.

At step 340, the SdownRdown data set 407 may be redatumed by known methods such that the receiver depth is the same as the source depth. Note that this step may be optional and may only be necessary if the source and receiver depths differ. FIG. 4D illustrates the redatumed SdownRdown data set 407R. The new receiver 435 depth is the same as the source 220 depth. When compared to the SdownRdown data set 407 in FIG. 4C, raypath 470R may be the redatumed raypath of raypath 470 and raypath 475R may be the redatumed raypath of raypath 475.

At step 350, the 2D or 3D SRME result may be calculated in a manner that retains surface reflection information. The SdownRup data set 406 and the redatumed SdownRdown data set 407R may be used as input to 2D or 3D SRME. Various known SRME algorithms may be used. Steps 354 and 356 further detail the calculation of the SRME result.

At step 354, multi-dimensional convolutions may be performed using the SdownRup data set 406 and the redatumed SdownRdown data set 407R to yield a set of predicted multiples. Performing multi-dimensional convolutions may include convolving each raypath in the SdownRup data set 406 with every raypath in the redatumed SdownRdown data set 407R. FIG. 4E illustrates the set of predicted multiples 408 yielded by convolving the SdownRup data set 406 of FIG. 4C and the redatumed SdownRdown data set 407R of FIG. 4D. For example, raypath 450 from the SdownRup data set 406 may be convolved with raypath 470R from the redatumed SdownRdown data set 407R to yield the predicted multiple raypath 490. Likewise, raypath 450 from the SdownRup data set 406 may be convolved with raypath 475R from the redatumed SdownRdown data set 407R to yield the predicted multiple raypath 492. Raypath 455 from the SdownRup data set 406 may be convolved with raypath 470R from the redatumed SdownRdown data set 407R to yield the predicted multiple raypath 494. And raypath 455 from the SdownRup data set 406 may be convolved with raypath 475R from the redatumed SdownRdown data set 407R to yield the predicted multiple raypath 496. It should be noted that for simplicity FIG. 4A illustrates seismic data with only a primary reflection 400 and a first order multiple reflection 402. However, typical seismic data may include several orders of multiples. In typical applications, the set of predicted multiples 408 may include a single first order multiple that is correctly predicted including sea surface reflection effects. In addition, the set of predicted multiples 408 may include several higher order multiples that are each predicted more than once with some of the predictions incorrectly handling sea surface reflection effects. The sea surface reflection effects may be incorrect in some predictions because the convolution process may position raypaths in predicted multiples at incorrect times. In other words, the reflections in the predicted multiples may have occurred at different times, and thus with different sea surface reflection effects, than the reflections in the recorded multiples.

At step 356, the set of predicted multiples 408 may be adaptively subtracted from the SdownRup data set 406 to yield an SRME result. FIG. 4F illustrates the SRME result 409 when the predicted multiples 408 of FIG. 4E are adaptively subtracted from the SdownRup data set 406 of FIG. 4C. Raypath 450 of the SdownRup data set 406 will not have a corresponding raypath in the set of predicted multiples 408 and, therefore, may not be subtracted out of the SdownRup data set 406 and may become part of the SRME result 409. Note that a goal of seismic data processing may be to isolate the ghost-free raypath of the primary reflection 400, so raypath 450 is desired. Raypath 455 of the SdownRup data set 406 may be subtracted out of the SdownRup data set 406 by raypath 490 of the predicted multiples 408. However, raypaths 492 and 494 both predict the second order multiple and raypath 494 may be an incorrectly predicted multiple due to sea surface reflection effects. Raypath 496 may also incorrectly predict the third order multiple due to sea surface reflection effects. As described above, the set of predicted multiples 408 may include several higher order multiples that are each predicted more than one time with some of the predictions incorrectly handling sea surface reflection effects. All higher order multiples in the SdownRup data set 406 that are subtracted by the imperfectly predicted higher order multiples in the set of predicted multiples 408 will become part of the SRME result 409. Note that the SRME result 409 may now include the ghost-free raypath of the primary reflection 400 and second and higher order multiples, such as raypaths 498 and 499. The first order multiples may be correctly predicted and removed.

At step 360, the SRME step 350 may be repeated one or more times using the latest SRME result from step 356 in step 354 in place of the SdownRup data set 406. In general, each iteration extends the scope of proper multiple prediction to one additional order of multiple events. FIGS. 5A-5C illustrate a second iteration of SRME, step 350, in accordance with implementations of various techniques described herein. FIG. 5A illustrates two data sets, the SRME result 409 and the redatumed SdownRdown data set 407R, to be convolved in step 354. Note that for simplicity in the illustration, the third-order multiple 499 has not been included in the illustration of the SRME result 409, but would be included in calculations.

FIG. 5B illustrates the new set of predicted multiples 508 yielded by step 354, convolving the SRME result 409 and the redatumed SdownRdown data set 407R. For example, raypath 450 from the SRME result 409 may be convolved with raypath 470R from the redatumed SdownRdown data set 407R to yield the predicted multiple raypath 590. Likewise, raypath 450 from the SRME result 409 may be convolved with raypath 475R from the redatumed SdownRdown data set 407R to yield the predicted multiple raypath 592. Raypath 498 from the SRME result 409 may be convolved with raypath 470R from the redatumed SdownRdown data set 407R to yield the predicted multiple raypath 594. And raypath 498 from the SRME result 409 may be convolved with raypath 475R from the redatumed SdownRdown data set 407R to yield the predicted multiple raypath 596.

FIG. 5C illustrates the new SRME result after step 356 where the new set of predicted multiples 508 of FIG. 5B are adaptively subtracted from the SdownRup data set 406 of FIG. 4C. It should be noted that the SdownRup data set 406 of FIG. 4C may include higher order multiples that are not illustrated, such as a second order multiple. Raypath 450 of the SdownRup data set 406 will not have a corresponding raypath in the new set of predicted multiples 508 and, therefore, may not be subtracted out of the SdownRup data set 406 and becomes part of the SRME result 509. However, raypath 455 of the SdownRup data set 406 may be subtracted out by raypath 590 of the predicted multiples 508. Similarly, a raypath of the second order multiple of the SdownRup data set 406 may be subtracted out by correctly predicted raypath 592 of the predicted multiples 508. However, raypaths 594 and 596 may incorrectly predict the higher order multiples due to sea surface reflection effects and may be unable to subtract the higher order multiples in the SdownRup data set 406. The higher order multiples in the SdownRup data set 406 may become part of the new SRME result 509. The new SRME result 509 may now include the ghost-free raypath of the primary reflection 400 and third and higher order multiples. Note that with each iteration of step 360 the order of the multiples remaining in the SRME result 509 may increase and that additional multiples may be eliminated. In this manner, dual-wavefield seismic data may be processed to attenuate surface multiples using SRME in a manner that properly predicts sea surface reflection effects.

Figure 6:
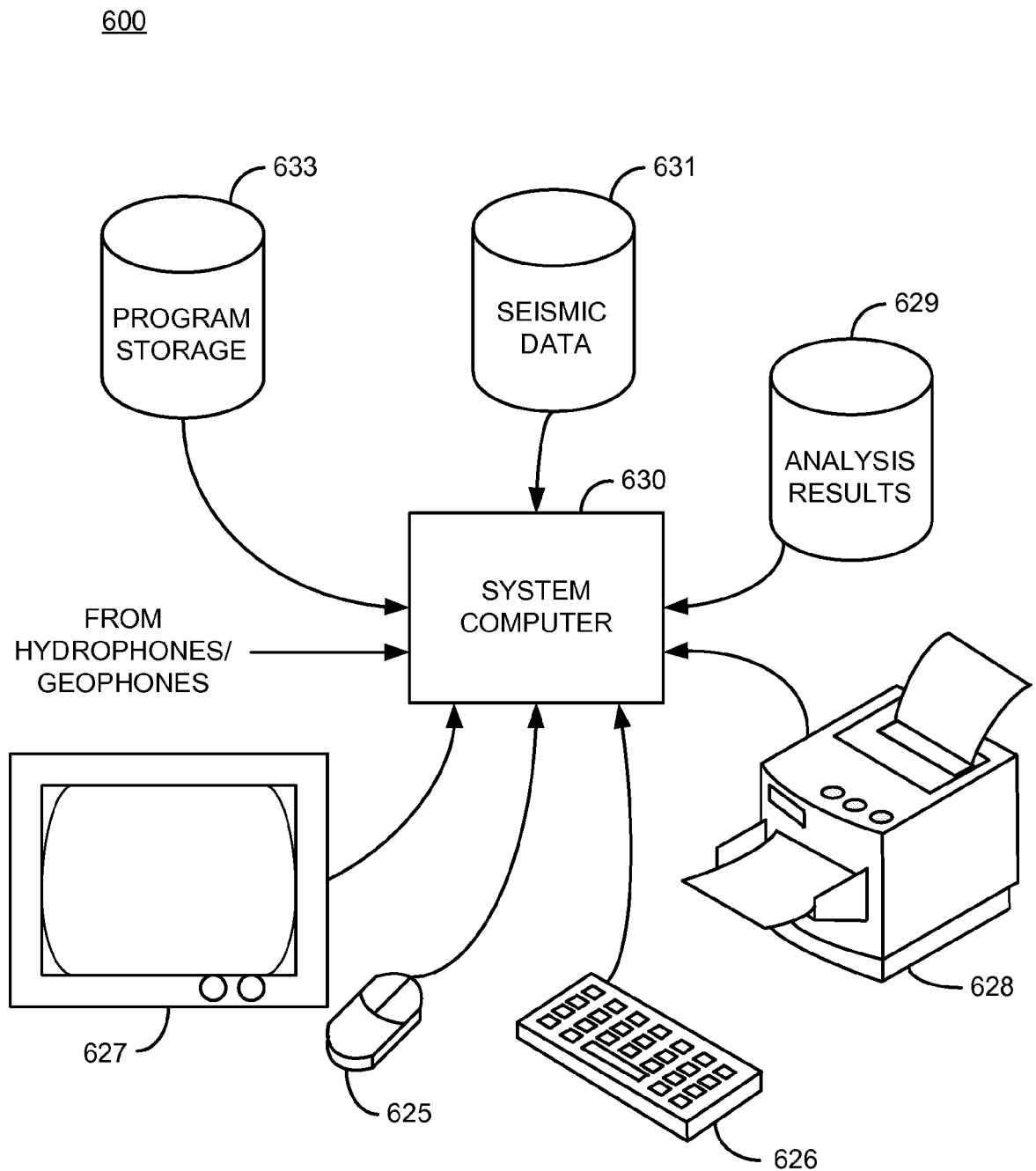
FIG. 6 illustrates a computing system, into which implementations of various techniques described herein may be implemented.

FIG. 6 illustrates a computing system 600, into which implementations of various techniques described herein may be implemented. The computing system 600 may include one or more system computers 630, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, seismic data from the receivers may be stored in disk storage device 631. The system computer 630 may retrieve the appropriate data from the disk storage device 631 to process seismic data according to program instructions that correspond to implementations of various techniques described herein. The program instructions may be written in a computer programming language, such as C++, Java and the like. The program instructions may be stored in a computer-readable medium, such as program disk storage device 633. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 630. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 630 may present output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 may be in communication with the receivers (either directly or via a recording unit, not shown), to receive signals indicative of the reflected seismic energy. These signals, after conventional formatting and other initial processing, may be stored by the system computer 630 as digital data in the disk storage 631 for subsequent retrieval and processing in the manner described above. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

Although Kirchhoff Scattering Series: Another Insight Into The Multiple Attenuation Method Geophysics, 68, 16-28 (2003) by Ikelle, L. T., Amundsen, L., Gangi, A., and Wyatt, S. B. ("Ikelle, et al.") may present possible approaches to eliminate ghost and surface multiples, a review of that paper reveals a number of flaws that makes those approaches either incorrect or impractical. In particular, the proposed iteration scheme does not remove source ghosts; rather, it creates a growing sequence of non-physical events that may be an ever increasing challenge for adaptive subtraction. Surface-related multiple suppression in dual-sensor towed-streamer data: SEG Expanded Abstracts, v. 26, p. 2450-2544 (2007) by Sollner, W. et al. ("PGS") has described a 2D version of SRME that is based on the theory derived by Ikelle, et al. However, PGS's published methodology does not describe using dual-wavefield measurements on the source side to free SRME from source deghosting concerns. Also, PGS does not reveal an iterative procedure that extends the scope of correctly predicted multiples including all sea surface effects beyond the first-order. Finally, PGS does not mention the possibility of performing dual-wavefield SRME where the up/down wavefield separation is accomplished by a 3D algorithm.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for attenuating surface multiple reflections in dual-wavefield seismic data, comprising:

(a) performing wavefield separation on dual-wavefield seismic data to separate events in the seismic data into data sets according to ghost characteristics, wherein the dual-wavefield seismic data have been acquired by two or more sensors;

(b) applying a multidimensional Surface-Related Multiple Elimination (SRME) to two or more of the data sets to yield an SRME result in a manner that retains surface reflection information affecting surface multiple reflections; and (c) repeating step (b) one or more times using the SRME result from the previous step (b) as one of the data sets for the multidimensional SRME.

2. The method of claim 1, wherein step (b) is repeated two or more times.

3. The method of claim 1, wherein performing wavefield separation on dual-wavefield seismic data to separate events in the seismic data into data sets according to ghost characteristics comprises:
performing source-side wavefield separation on the dual-wavefield seismic data to divide the seismic data into a source-side upgoing data set and a source-side downgoing data set;
discarding the source-side upgoing data set; and
performing receiver-side wavefield separation on the source-side downgoing data set to subdivide the source-side downgoing data set into a source-side downgoing and receiver-side upcoming data set and a source-side downgoing and receiver-side downcoming data set.

4. The method of claim 3, wherein applying the multidimensional Surface-Related Multiple Elimination (SRME) to the two or more of the data sets to yield the SRME result in a manner that retains surface reflection information comprises:
performing multi-dimensional convolutions using the source-side downgoing and receiver-side upcoming data set and the source-side downgoing and receiver-side downcoming data set to predict multiples; and
adaptively subtracting the predicted multiples from the source-side downgoing and receiver-side upcoming data set.

5. The method of claim 4, wherein repeating step (b) one or more times further comprises: using the SRME result from the previous step (b) in place of the source-side downgoing and receiver-side upcoming data set when performing the multi-dimensional convolutions.

6. The method of claim 1, wherein applying the multidimensional Surface-Related Multiple Elimination (SRME) further comprises: applying a two dimensional Surface-Related Multiple Elimination (SRME).

7. The method of claim 1, wherein applying the multidimensional Surface-Related Multiple Elimination (SRME) further comprises: applying a three dimensional Surface-Related Multiple Elimination (SRME).

8. The method of claim 1, wherein applying the multidimensional Surface-Related Multiple Elimination (SRME) to the two or more of the data sets to yield the SRME result in a manner that retains surface reflection information further comprises:
performing multi-dimensional convolutions using one or more of the data sets to predict multiples; and
adaptively subtracting the predicted multiples from one of the data sets.

9. A computer-readable non-transitory medium having stored thereon computer-executable instructions which, when executed by a computer, cause the computer to:
(a) perform wavefield separation on dual-wavefield seismic data to separate events in the seismic data into data sets according to ghost characteristics, wherein the dual-wavefield seismic data have been acquired by two or more sensors;
(b) perform multi-dimensional convolutions using two or more of the data sets to predict multiples;
(c) adaptively subtract the predicted multiples from one of the data sets to yield an SRME result; and
(d) repeat steps (b)-(c) one or more times using the SRME result from the previous step (c) when performing the multi-dimensional convolutions.

10. The computer-readable non-transitory medium of claim 9, wherein the computer-executable instructions which, when executed by a computer, cause the computer to perform wavefield separation on dual-wavefield seismic data to separate events in the seismic data into data sets according to ghost characteristics, is further configured to cause the computer to:
perform source-side wavefield separation on the dual-wavefield seismic data to divide the seismic data into a source-side upgoing data set and a source-side downgoing data set;
discard the source-side upgoing data set; and
perform receiver-side wavefield separation on the source-side downgoing data set to subdivide the source-side downgoing data set into a source-side downgoing and receiver-side upcoming data set and a source-side downgoing and receiver-side downcoming data set.

11. The computer-readable non-transitory medium of claim 10, wherein the computer-executable instructions which, when executed by a computer, cause the computer to perform multi-dimensional convolutions, is further configured to: cause the computer to perform two dimensional or three dimensional convolutions.

12. The computer-readable non-transitory medium of claim 10, wherein the computer-executable instructions which, when executed by a computer, cause the computer to perform multi-dimensional convolutions using one or more of the data sets to predict multiples, is further configured to: cause the computer to perform multi-dimensional convolutions using the source-side downgoing and receiver-side upcoming data set and the source-side downgoing and receiver-side downcoming data set to predict multiples.

13. The computer-readable non-transitory medium of claim 10, wherein the computer-executable instructions which, when executed by a computer, cause the computer to adaptively subtract the predicted multiples from one of the data sets, is further configured to: cause the computer to adaptively subtract the predicted multiples from the source-side downgoing and receiver-side upcoming data set.

14. The computer-readable non-transitory medium of claim 10, wherein steps (b)-(c) are repeated two or more times.

15. A computer system, comprising:
a processor; and
a memory comprising program instructions executable by the processor to:
(a) perform source-side wavefield separation on dual-wavefield seismic data to divide the seismic data into a source-side upgoing data set and a source-side downgoing data set, wherein the dual-wavefield seismic data have been acquired by two or more sensors;
(b) discard the source-side upgoing data set;
(c) perform receiver-side wavefield separation on the source-side downgoing data set to subdivide the source-side downgoing data set into a source-side downgoing and receiver-side upcoming data set and a source-side downgoing and receiver-side downcoming data set;
(d) perform multi-dimensional convolutions using the source-side downgoing and receiver-side upcoming data set and the source-side downgoing and receiver-side downcoming data set to predict multiples;
(e) adaptively subtract the predicted multiples from the source-side downgoing and receiver-side upcoming data set to yield an SRME result; and
(f) repeat steps (d)-(e) one or more times using the SRME result from the previous step (e) in place of the source-side downgoing and receiver-side upcoming data set when performing the multi-dimensional convolutions of step (d).

16. The computer system of claim 15, wherein the program instructions executable by the processor to perform multi-dimensional convolutions comprise program instructions executable by the processor to apply two dimensional convolutions.

17. The computer system of claim 15, wherein the program instructions executable by the processor to perform multi-dimensional convolutions comprise program instructions executable by the processor to apply three dimensional convolutions.

18. The computer system of claim 15, wherein steps (d)-(e) are repeated two or more times.

* * * * *